Patented Apr. 26, 1949

2,468,533

UNITED STATES PATENT OFFICE 2,468,533

BITUMINOUS EMULSIONS

Lee Worson, Los Angeles, Calif., assignor to The Patent and Licensing Corporation, New York, N. Y., a corporation of Massachusetts No Drawing. Application January 8, 1946, Serial No. 639,913

8 Claims. (Cl. 252—311.5)

This invention relates to improvements in bituminous emulsions and is concerned more particularly with aqueous bituminous emulsions of the type made with bentonite as the emulsifying agent.

Aqueous emulsions of bitumen have long been made with the use of bentonite as the emulsifying agent. Among the chief advantages of bentonite, in contrast to common clay, as the emulsifying agent for bitumens is its ability to emulsify relatively large proportions of bitumen such as asphalt. Thus, under appropriate emulsifying conditions, bentonite may be employed to produce asphalt emulsions containing as high as 60 to 65% asphalt, with 2 to 3% bentonite and 33 to 38% water. Another advantage of bentonite is its ability to maintain the emulsified particles in suspension in the emulsion over long periods of time. Still another advantage of using bentonite for this purpose is its property of forming, when water is eliminated from a film of the emulsion, a honeycomb structure of a character which renders the dried film resistant to flow at temperatures greatly in excess of the melting point of the bitumen.

It has long been recognized, however, that most bentonites, particularly those which come from deposits in Wyoming, Colorado and Utah, when used as an emulsifying agent for bitumen, exhibit a tendency to bring about, in varying degree, reemulsification of dried films of the emulsion upon relatively long contact with very soft, rain or distilled water. This tendency is especially manifested in those instances where the temperature under which the film is dried, or the time elapsed before the dried film is subjected to prolonged contact with water, have not been sufficiently great to promote complete wetting of the walls of the bentonite structure by the coalesced asphalt particles. Thus, when emulsions made with these bentonites are employed as a coating on a roof, the tendency of the dried film to reemulsify is relatively less pronounced (when subjected to prolonged action of the heat of the sun before being exposed to the action of rain).

For the sake of brevity in the specification and in the claims, the term "reemulsifiable bentonite" will be employed to refer to, and is to be understood as including, any bentonite which normally has, as a characteristic thereof, the property of imparting the above-described reemulsifying tendency to bituminous emulsions made therewith.

The principal object of the invention is to produce bituminous emulsions with reemulsifiable bentonite as the emulsifying agent, characterized, however, by freedom from the tendency of the water-free film of the emulsion to reemulsify under normal conditions of usage.

I have found that the reemulsifying tendency of dried films of bituminous emulsions made with reemulsifiable bentonite, such as Wyoming bentonite, may be eliminated by incorporating in the bituminous emulsion, or in the aqueous suspension of the bentonite with which the emulsion is made, relatively small quantities of ionizable, substantially neutral, salts of high potential alkaline earth metals. Examples of such salts are calcium chloride, barium chloride, magnesium chloride and strontium chloride.

In the case of bituminous emulsions containing 50% to 65% of asphalt, 2% to 5% of reemulsifiable bentonite and 33% to 45% of water, any of the above-mentioned salts, incorporated in the pre-formed emulsion in an amount of from 0.05% to 2%, preferably 0.1% to 1% by weight of the emulsion, will render the water free film of the emulsion free of any tendency to reemulsify when subjected to long contact with rain water.

If desired, the above-mentioned alkaline earth salts may be incorporated in the aqueous suspension of the reemulsifiable bentonite used for emulsifying the bitumen, and in such instances the amount of salt may vary from 2% to 75%, preferably 5% to 50% by weight of the bentonite in the suspension.

Although water soluble salts, other than the chlorides of the above-mentioned alkaline earth metals may be employed, it is preferred to use the chlorides since these are the least costly and each of them is practically neutral in water solution, and hence do not tend to cause any thickening of the emulsion when added thereto, as would be the case with salts that have an acid or a basic reaction, although basic salts of alkaline earth metals may be employed if they do not cause objectionable thickening. As a practical matter, I find that among the salts above-mentioned, calcium chloride is most desirable since this salt when added to the emulsion in an amount within the preferred range above stated serves not only to render the dried film of the emulsion non-reemulsifiable, but provides an excess of calcium chloride in the aqueous phase which has the effect of materially increasing the fluidity of the emulsion to a degree which would otherwise require substantial dilution of the emulsion with water. This effect is evidently due to the hygroscopic property of calcium chloride functioning to abstract water from the colloidal gel of bentonite surrounding the emulsified asphalt particles so that such abstracted water becomes part of the water phase of the emulsion. Furthermore, calcium chloride when employed in amounts within the preferred range above stated provides a sufficient excess thereof so that its hygroscopic property serves to prevent excessive rate of drying of the emulsion when applied as a film under conditions where such rate of drying otherwise would cause cracking of the film during drying.

With respect to the effectiveness of the water soluble, alkaline earth salts referred to above in rendering the dried films of the emulsions non-reemulsifiable even though made with reemulsifiable bentonite, I believe, although I do not desire to be restricted to this theory, that this is accounted for by a base exchange reaction between the cation of the ionized soluble salt and the bentonite. At least, it has been observed that bentonites which normally tend to produce films that are reemulsifiable possess a high base exchange capacity as determined by measuring the milli-gram equivalents of base which can combine with 100 grams of the bentonite. As so determined, the base exchange capacity of these bentonites is of the order of 90. That is to say, 90 milli-gram equivalent of calcium ion can combine with 100 grams of the bentonite. On the other hand, bentonites which produce emulsions that normally do not exhibit any substantial tendency, in their dried films, to reemulsify upon contact with water, have a relatively low base exchange capacity. Apparently the water soluble alkaline earth salts, when employed in accordance with the invention, transform a normally reemulsifiable bentonite to a condition resembling the bentonites which are normally non-reemulsifiable.

Thus, in an emulsion containing, for example, approximately 60% asphalt, 2% reemulsifiable bentonite and 38% water, the bentonite having a base exchange capacity of 90, approximately 0.002% of calcium chloride would provide the minimum amount of calcium ion necessary to satisfy the base exchange capacity of the bentonite therein and render the dried films of the emulsion incapable of reemulsification. It will be seen, therefore, that the minimum amount in the above stated preferred range of 0.1% to 1% provides an excess of calcium chloride in the water phase which functions for the additional purposes above described.

Hereinabove, I have referred to the use of the water soluble salts of alkaline earth metals which are high potential metals. By this is meant those alkaline earth metals which show a figure of approximately 1.9 to 2.2 in their half-wave potentials as measured by the saturated calomel electrode at 25° C. On that scale, the half-wave potentials of magnesium and calcium measure 2.2, while that of barium measures 1.9.

I claim:

1. An aqueous emulsion comprising 50% to 65% bitumen as the dispersed phase, 2% to 5% reemulsifiable bentonite as the emulsifying agent, and 32% to 45% water as the continuous phase, said emulsion containing a water soluble, substantially neutral salt of a high potential alkaline earth metal in an amount sufficient to render dried films of said emulsion non-reemulsifiable when subsequently subjected to contact with water, said emulsion being one which in the absence of said salt produces reemulsifiable dried films.

2. An emulsion as defined in claim 1, wherein said salt is present in an amount of from 0.05% to 2% by weight of the emulsion.

3. An emulsion as defined in claim 1, wherein said salt is present in an amount of 0.1% to 1% by weight of the emulsion.

4. An emulsion as defined in claim 1, wherein said salt is a hygroscopic salt.

5. An emulsion as defined in claim 1, wherein said salt is a hygroscopic salt and said salt is present in an amount from 0.1% to 1% by weight of the emulsion.

6. An emulsion as defined in claim 1, wherein said salt comprises calcium chloride.

7. An emulsion as defined in claim 1, wherein said salt comprises barium chloride.

8. An emulsion as defined in claim 1, wherein said salt comprises magnesium chloride.

LEE WORSON.

REFERENCES CITED

The following references are of record in the file of this patent:

UNITED STATES PATENTS

| Number | Name | Date |
|---|---|---|
| 1,733,494 | Kirschbraun | Oct. 29, 1929 |
| 2,099,351 | Smith | Nov. 16, 1937 |
| 2,104,077 | Groskopf | Jan. 4, 1938 |
| 2,372,658 | Buckley et al. | Apr. 3, 1945 |
| 2,376,447 | Mullin | May 22, 1945 |

FOREIGN PATENTS

| Number | Country | Date |
|---|---|---|
| 321,334 | Great Britain | Nov. 7, 1929 |